United States Patent [19]
Greene, Jr.

[11] Patent Number: 5,429,290

[45] Date of Patent: Jul. 4, 1995

[54] RETROFITABLE PASSENGER OR CARGO CARRIER FOR A GOLF CART

[76] Inventor: George J. Greene, Jr., R.R. Rte. No. 1 Box 430A, La Rue, Tex. 75770-9756

[21] Appl. No.: 157,365

[22] Filed: Nov. 22, 1993

[51] Int. Cl.⁶ .............................. B60R 9/08
[52] U.S. Cl. .................. 224/274; 224/42.01; 280/DIG. 5
[58] Field of Search .......... 224/274, 42.01, 42.32, 224/42.42, 42.43, 42.03 A, 42.44; 280/DIG. 5, 288, 288.4, 304, 304.5; 296/10, 37.1

[56] References Cited

U.S. PATENT DOCUMENTS

| | | | |
|---|---|---|---|
| D. 229,489 | 12/1973 | Hopkins, Jr. | 296/10 |
| 1,941,860 | 1/1934 | Hanson | 224/42.44 |
| 2,380,557 | 7/1945 | Terry | 296/24 |
| 2,556,101 | 6/1951 | Negin et al. | 224/42.43 |
| 2,867,471 | 1/1959 | Coon, Jr. | 224/42.42 R |
| 3,671,071 | 6/1972 | Evinrude | 296/69 |
| 3,833,253 | 12/1972 | Butler | 296/23 MC |
| 4,334,692 | 10/1979 | Lynch | 280/79.1 A |
| 4,355,747 | 8/1981 | Casady | 244/274 |
| 4,480,868 | 8/1982 | Koto | 296/190 |
| 5,052,604 | 10/1991 | Tourangeau | 224/274 |
| 5,060,748 | 10/1991 | Iwai et al. | 296/37.1 |
| 5,069,481 | 8/1990 | Strange | 280/796 |
| 5,088,635 | 8/1990 | Taylor et al. | 224/274 |
| 5,190,340 | 5/1992 | Nusher | 296/99.1 |
| 5,213,364 | 5/1993 | Theckston | 224/274 |

Primary Examiner—J. Casimer Jacyna
Assistant Examiner—Steven O. Douglas
Attorney, Agent, or Firm—Charles W. Alworth; Ronald B. Sefrna

[57] ABSTRACT

A retrofitable passenger/cargo carrier unit for standard utility golf carts is disclosed. The passenger/cargo carrier unit is designed to be retrofitable to any passenger type golf cart and is mountable to the cart without drilling holes in the cart through the use of adjustable clamps which hold onto existing support tubes found such carts. The carrier unit converts readily between a cargo carrier and passenger carrier which is capable of carrying up to two extra passengers. The passengers are seated parallel to the direction of motion of the cart and passenger additional safety is provided by a rear gate. A "swing-away" clamp is disclosed for use with the passenger/cargo carrier which allows the existing golf bag holder assembly to swing out of the way of rear passengers or cargo; thus assuring the functionality of the carrier. Further a rear canopy for the protection of rear passengers or cargo is disclosed which attaches to the carrier. The rear canopy being carefully designed so that it does not interfere with any after market inclement weather covers available for standard golf carts.

12 Claims, 11 Drawing Sheets

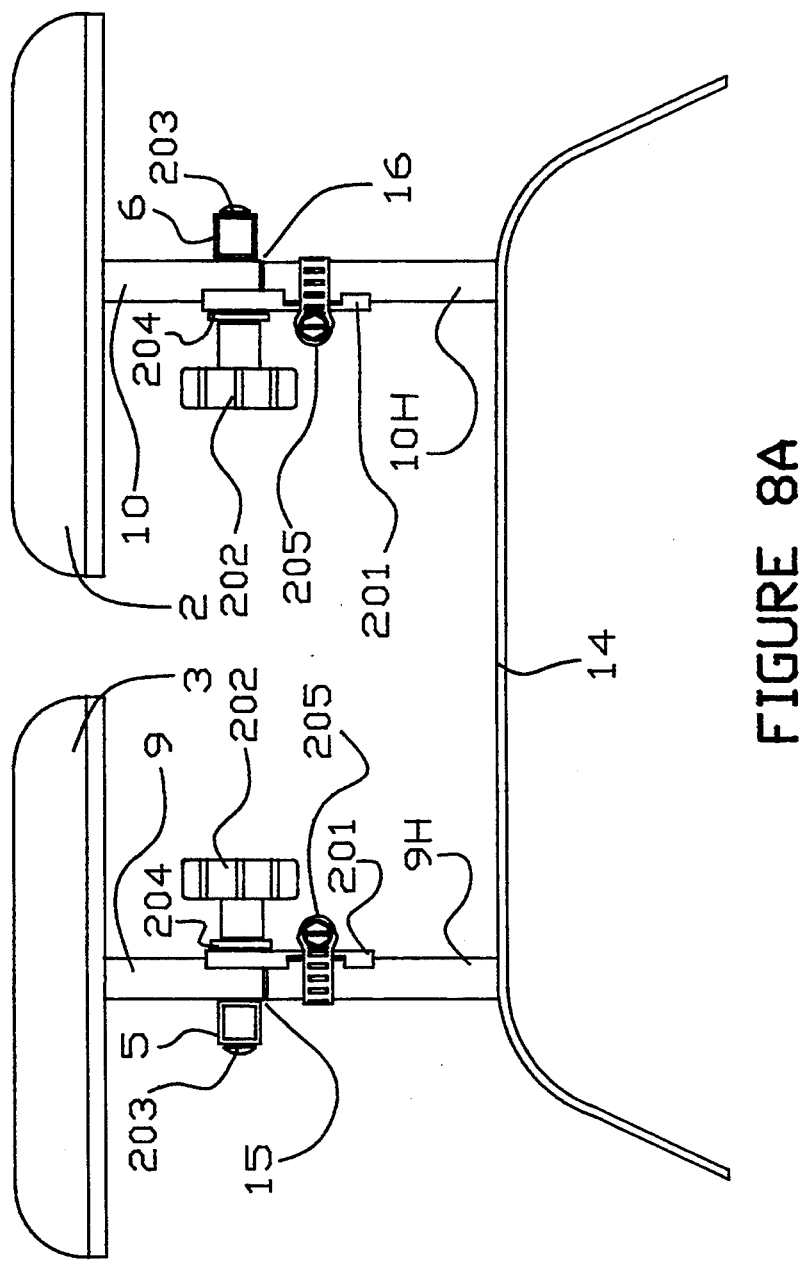

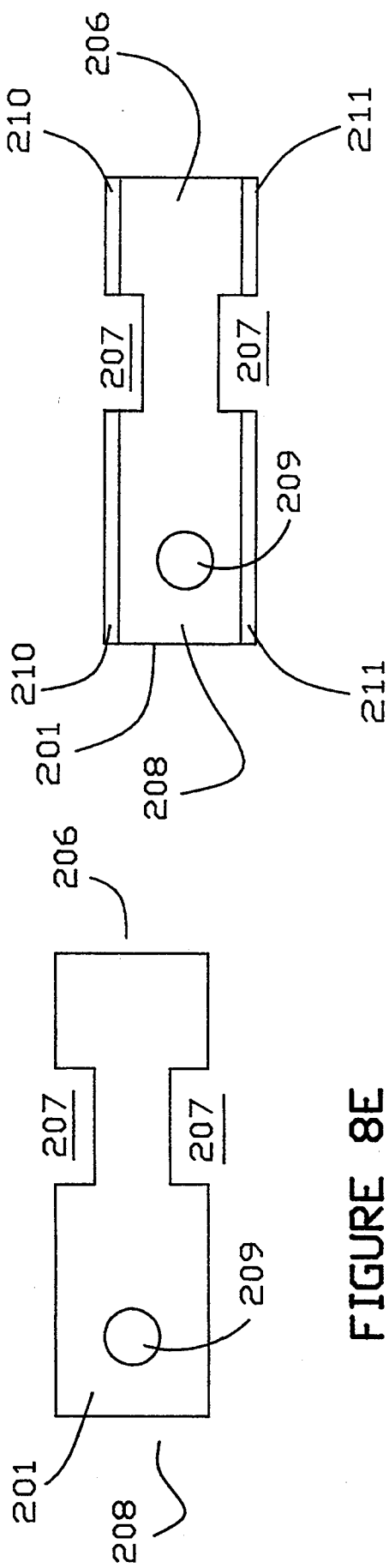
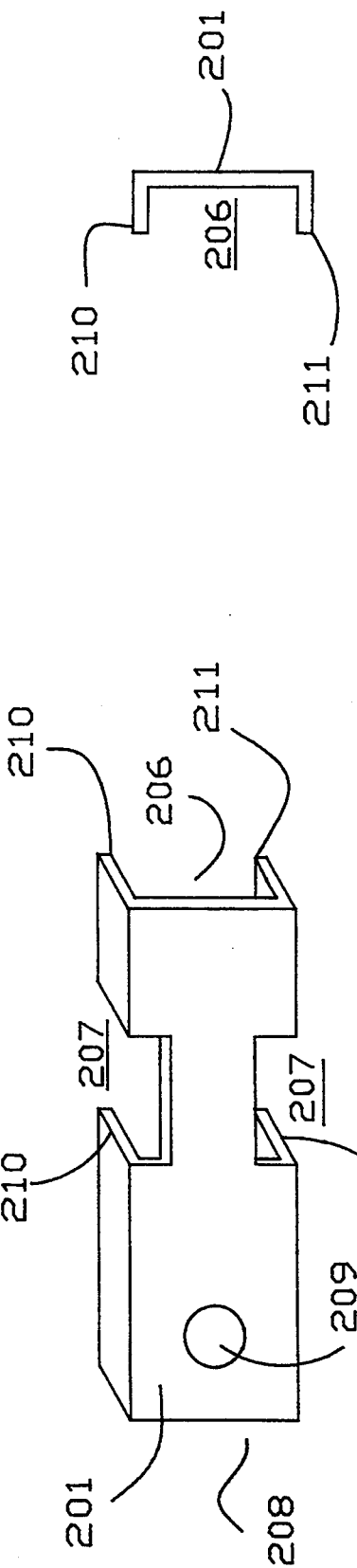
FIGURE 8D
FIGURE 8C
FIGURE 8E
FIGURE 8B 5,429,290

RETROFITABLE PASSENGER OR CARGO CARRIER FOR A GOLF CART

TECHNICAL FIELD OF THE INVENTION

The instant invention relates to readily convertible passenger to cargo carriers and specifically to a retrofitable carrier for use with golf carts.

BACKGROUND OF THE INVENTION

Americana is taking advantage of the increase in leisure time afforded by modern living standards and in particular Americans are enjoying the game of golf. Many golfers use the motorized golf cart which comes in to basic forms being the electric motor driven cart or the internal combustion engine driven cart. Many of these carts have found use off of the golf course as a utility vehicle. These carts can be found in retirement communities where they are used by retired people for simple transportation within the community and for shopping expeditions within the same community. Many large apartment complexes use this utility vehicle to take prospective clients on a tour of their facility and many such complexes use these carts to transport their maintenance personnel and tools. Similarly other Americans have found the golf cart to be an extremely useful utility vehicle.

The golf cart generally comes in two forms; a two passenger vehicle, where the passengers sit in front next to each other with one of them serving as the driver and a rear section that is designed strictly to hold a pair of golf club bags; or a four (plus) vehicle, where two passengers, one still acting as the driver, sit in the front and the other passengers sit in the back, usually facing backward. The two passenger vehicle is the most common, mainly because it holds golf club bags; technically the four (plus) passenger vehicle is a two passenger vehicle with the golf club bag portion permanently removed and a rearward facing bench seat in its place.

Many owners of the two passenger models have converted their vehicles to four (plus) vehicles by removing the golf club bag holders and permanently bolting a rearward facing seat in its place. Other owners have converted these golf carts to cargo carriers by removing the golf club bag holder(s) and permanently bolting a cargo compartment in place. Basically the two passenger golf cart is being converted into a utility vehicle by a number of users. There are several drawbacks with the four passenger (plus) vehicle, the converted two passenger to four passenger vehicle and the converted two passenger to cargo vehicle. One drawback is that they can no longer be used as a standard golf cart. Another drawback, in the case of the four passenger vehicle with the passengers facing backward, it is difficult to can), on a conversation between the forward and rearward facing passengers. However, the main drawback for the four passenger cart is safety; there have been numerous incidents where the rear passengers slid off the bench seat and were injured. This problem has been partially solved by using a safety belt; the question remains as to how many "sports" passengers will use the belts.

The inventor has devised an apparatus which consists of three interrelated concepts and can be attached to a two passenger golf cart without any permanent damage, to the cart, by using existing holes on the cart. The invention consists of a vehicle body unit that provides additional seating for a total of three passengers plus a driver, that readily converts to a cargo carrier, and readily returns to the golf cart mode in that the cart can store and transport golf club bags as originally envisioned by the manufacturer of the cart. The invention includes a second apparatus which allows the original golf club bag holder to move out of the way while the cart is being used for cargo or extra passengers and allows the golf club bag holder to swivel back into its original position when the vehicle is returned to regular golf cart mode. And the invention provides for a canopy over the rear section which is designed to be attached only to the passenger/cargo carrier unit of the instant invention and does not interfere with other available accessories offered by the original manufacturer or other after market manufacturers. The canopy will protect the rear section passengers, cargo, or golf clubs.

PRIOR ART

Since this invention is a clever combination of three concepts, namely a vehicle body unit, a swing away out of the way golf club bag holder, and a canopy, the prior art will be discussed in that order. Vehicle body units are described in U.S. Pat. No. 2,380,557, U.S. Pat. No. 3,833,253, U.S. Pat. No. 4,480,868 which relate to automobile body units and in U.S. Pat. No. 3,671,071.

U.S. Pat. No. 2,380,557 (Terry) is purely related to providing cargo canning compartments in a commercial road vehicle and teaches the art of metal bending and forming. U.S. Pat. No. 3,833,253 (Butler) discloses a one-man camper body shell which is to be mounted inside a pickup truck bed. Butler teaches a method of conversion between a sleeper inside the camper shell and cargo space within the same camper shell. The art involves the use of complex hinges and arms which would not readily operate on a simple golf cart. In a similar manner U.S. Pat. No. 4,480,868 (Koto) discloses a method of converting a pick-up truck bed into a second seat and swiveling the back wall of the pick up truck cab to form a canopy over the second seat passengers. The device uses a series of hinges and arms, similar to Butler and would be impossible to install on a simple golf cart.

The closest prior art is U.S. Pat. No. 3,671,071 (Evinrude) which teaches a converting and folding rearward facing bench seat for a golf cart. The system works quite well, for when the seat is set up, two passengers can readily be seated; however, they will face to the rear and will need a safety belt to stop them from sliding off the bench seat. The bench seat will fold down to provide limited cargo space; that is, cargo can be set on top of the folded seat. Another drawback is that a set of golf clubs can no longer be placed in the vertical position in the cart golf club bag well, as that well will be permanently blocked by the seat whether folded or unfolded. When the cart is used for golf, the bags will have to be set in cargo area in a horizontal position, thus the clubs could easily slip out of the bag. The folding mechanism is a complex series of arms and spring, not unlike the mechanisms of Butler and Koto.

Thus it can be seen that the prior art for convertible add-on passenger/cargo units does not properly address the problem of ready conversion between the two passenger golf cart to a general utility vehicle or the four passenger cart to a cargo cart. It can also be seen that the folding extra seat of the prior art does not resolve the safety problem and totally ignores the original function of a golf cart which is to carry golf club bags.

U.S. Pat. No. 4,355,746, U.S. Pat. No. 5,052,604, U.S. Pat. No. 5,069,481 and U.S. Pat. No. 5,088,635 address the problem of the golf club restraining device. It is apparent that golf carts were originally designed to be used on a golf course and were meant to transport golf clubs. The additional utility use imposed on these vehicles has brought about a perceived problem with the golf club bag holder. For example, Evinrude's patented folding rearward facing seat requires the complete removal of the bag holder. U.S. Pat. No. 5,052,604 (Tourangeau) and U.S. Pat. No. 5,088,635 (Taylor et al.) address the problem of adding more sets of golf club bags to the golf cart. These inventors saw a need when a foursome was playing, two of whom would prefer to walk but not carry their bags. Thus, these inventors devised a system to add extra bag handling capacity to the cart. However, neither of these systems will operate in conjunction with Evinrude to provide an easily restorable golf bag holder when the extra bench is taken out of service.

U.S. Pat. No. 5,069,481 (Strange) provides a means for rack mounting clubs in the back of a two passenger golf cart. The system uses a series of clamps, racks and pipes to store and rack sets of golf clubs. The disclosure does not address golf club bags, but could be used in conjunction with Evinrude's folding seat to semi-restore the golfing function to a four passenger golf cart after it is returned to regular two passenger service. The only drawback is that the conversion process would take a lots of time and the user would tire of the system.

U.S. Pat. No. 4,355,746 (Casady) discloses a spring loaded set of arms which is designed to vertically support golf club bags. The design requires that the original golf bag well be available for two sets of bags and adds two u-shaped holders over the rear wheel fenders to hold two more sets of bags. Again this system would not work in conjunction with Evinrude's folding seat and is completely different from the cart manufacturer's supplied golf club bag holder.

Thus the prior art does not resolve the problem of supporting golf club bags when the user desires to readily convert the utility version of the golf cart back to its original function; namely to use it on the golf course and carry two sets of bags.

There have been a number of attempts to provide a secondary canopy over the rear passengers, the rear cargo or golf club bags. The major manufacturers of golf carts provide canopies for the front two passengers as an optional extra. These manufacturer's canopies are of fixed design and a number of after :market manufacturers have designed covers, made of plastic, canvas or a combination of both, which attach to the manufacturer's canopy in order to keep out inclement weather and winter cold. These after market covers wrap around and over the original canopy and drop vertically down from that canopy. The corners of the covers zip or clip together, the front cover is clear (some carts come with a front windscreen and hence the front cover is not necessary), and the side covers form doorways. Any interference with the original canopy will preclude the use of readily available after market covers and require the use of more expensive special order inclement weather covers. It is imperative that any rear canopy be designed with previous after market cover sets in mind; mainly because a number of golf cart users operate their carts in the winter as a utility vehicle. This is particularly true in retirement communities.

U.S. Pat. No. 4,334,692 (Lynch) discloses a detachable umbrella support for use with golf carts. Lynch actually sees his invention as being used to protect the front passengers, but the concept could be used to protect the back passengers and cargo. There is one drawback, often golf cart owners transport their golf carts from one location to another on a trailer towed behind their car. The Lynch umbrella would have to be removed before towing the cart. Furthermore the Lynch umbrella would look somewhat peculiar attached to a cart and standing behind the manufacturer's original canopy.

U.S. Pat. No. 5,190,340 (Nusher) addresses most of the problems of Lynch. Nusher discloses a canopy assembly for a rearward protective rooftop. This canopy attaches to the manufacturer's original canopy and rotates about the rearward portion of the original canopy to allow access to the golf clubs or cargo stored in the golf club bag well. To remove a club or cargo, the user must lift the canopy, rotate it by ninety degrees, hold the canopy in place, remove or swop the club, and then lower the canopy. One hand must be on the canopy; otherwise it will fall back in place. This becomes a major drawback if the holder needs both hands to remove an item from the bag or the cargo area. The other major drawback is that Nusher's canopy interferes with the original canopy and precludes the use of less expensive abet market covers. That is, the Nusher canopy will require special order after market inclement weather covers.

The prior art has solved the problem of protection for the rear passenger, cargo or golf clubs, but at the expense of special order covers. Furthermore the prior art canopy must be held in the open position.

In general there remains a need for a retrofitable passenger or cargo carrier for two passenger golf carts which allows them to become a useful utility vehicle. The conversion should not interfere with the original function of the golf cart, the conversion should allow all previous accessories to be retained, and should be easy to install.

SUMMARY OF THE INVENTION

The instant invention is a retrofitable passenger or cargo carrier which mounts upon a standard two passenger golf cart. The apparatus will allow the retrofitted vehicle to readily carry cargo, or up to two additional passengers in complete safety. Attachment of the apparatus is accomplished by two attachment clamps which connect to the front seat or canopy support tubes on the can. No drilling of holes in nor defacing of the original body or chassis of the golf cart is required. Installation of the passenger/cargo portion of the apparatus typically takes ten minutes and can be accomplished by the average consumer/user. The original golf bag holder racks must be modified by sawing through its two support tubes and placing a swing-away bracket at the point where the tubes were cut. The swing-away bracket clamps to one side of the original tube and attaches to an existing bolt hole on the other half of the tube and allows the golf club bag holder to function normally or to swing out of the way of rear passengers or cargo. Finally, the innovative rear canopy design attaches to the newly installed passenger/cargo carrier without interfering with the cart's original canopy.

The carrier system has three major components:
1) a passenger/cargo unit
2) a pair of swing-away brackets, and
3) a rear canopy assembly.

The passenger/cargo unit consists of a rectangular frame which sits on the fenders of a golf cart and is held in place by a set of special clamps attached to the front seat support tubes of the golf cart. The rectangular frame has sides and a bottom or base assembled together as a fixed unit. The rearward facing section of the frame forms a "gate" or door which can easily be swung open to allow access the original golf bag well on the cart. The bottom of the frame sits on the fenders and over the golf club bag well of the golf cart.

There are two opening covers in the base which pivot, about hinges, centered over the golf club bag well such that when they are open the well is exposed. The base opening covers are designed to lie flat over the wheel fenders when they are in the open position. Attached to the underside of the opening covers are seats which are exposed when the covers are open. When the base covers are closed, the passenger/cargo carrier forms a cargo carrier. Any cargo placed on the base or bottom of the carrier will be retrained by the carrier sides and the rear gate. When a base opening cover is open, the underside seat is exposed, and is positioned immediately over the rear wheel fender. An adult can easily sit in the seat, with the legs in the golf club bag well. If both covers are open, two adults can be seated, facing each other, transverse to the direction of the cart's motion. That is, the rear passengers are riding "side-saddle".

The rear passengers may easily enter the vehicle by opening the swinging gate, stepping into the golf club bag well, and sitting down on the seats. The cushioned seats are standard off-the-shelf fishing boat seats. Once a passenger is seated, that passenger may readily hold onto the cart's canopy rear support tube; thus, that passenger may firmly hold himself in the vehicle. There is no need for safety belts; because of the convenient handhold and the fact that a closed gate is utilized to positively retain the rear passengers within the framework of the passenger carrier. In addition, since the rear passengers are riding "side-saddle", that is transverse to the vehicle motion, they can readily talk to each other and to the front seat passengers. The passenger/cargo unit can readily be converted back to a cargo carrier by flipping the opening cover(s), or hinged seat panel(s), closed.

The swing-away bracket, for use with the golf club bag holder, resolves an awkward problem. The golf cart manufacturer permanently attaches the golf club bag holder to the front seat support tubes which in turn form the brace tubes for the front canopy support tubes. The golf club bag holder is a u-shaped tubular structure that extends over the golf club bag well and has a straps to restrain the bags. This structure will interfere with any rear passenger attempting to sit on the rear seats of the passenger/cargo unit. It is likely that the same holder would interfere with any cargo that is placed on the unit. There are two options:
1) completely remove the holder assembly, but this will preclude the use of the cart as a golf cart, or
2) devise an apparatus that will allow the holder to swing out of the way for passenger/cargo use and return to its original position for golfing use.

The swing-away bracket allows the golf club bag holder to swing out of the way. The inventor noted that the golf cart manufacturer used certain support tubing for two purposes: to support the golf bag holder, and to support the back of the front passenger seat. The manufacturer then bolts the dual purpose support assembly to the canopy rear support tubes. The swing-away brackets allow the user to detach by sawing the bag holder support tube away from the seat back support tube thus separating the items. Swing-away brackets are then clamped to the cut support tubes on the bag holder side. The original support mounting bolts are replaced with a longer bolt that also passes through an opening in the swing-away brackets. These bolts and the swing-away bracket now serve to let the bag holder rotate or swing-away about the bolts. Thus, the user need only loosen the bolt rotate the holder and tighten the bolt; this allows the holder to be out of the way or to be in its original position.

The rear canopy is supported by a pair of vertical support columns (typically angled iron) that attach to the front portion of the passenger/cargo unit. The support arms extend slightly above the roof line of the manufacturer's front canopy. A light structural frame is attached to the support arms with hinges such that the rear canopy frame is supported over the rear passenger/cargo unit. The hinges allow the rear canopy frame to rotate upward and come to rest on top the manufacturer's front canopy. Thus, the rear canopy can be positioned out of the way while rear passengers get into the vehicle, cargo is placed in the vehicle, or golf clubs are placed into or removed from golf bags. The rear canopy is made of canvas or plastic and attaches to the support frame. Most importantly, this innovative rear canopy does not interfere with any after market inclement weather covers.

BRIEF DESCRIPTION OF THE DRAWINGS

FIGS. 8A through 8E give details on the swing-away bracket.

DESCRIPTION OF THE PREFERRED EMBODIMENT

The Retrofitable Passenger or Cargo Carrier for a Golf Cart is designed to be used as an integrated system. The unit consists of three major components:
1) a passenger/cargo unit
2) a pair of swing-away brackets, and 3) a rear canopy.

Figure 4:
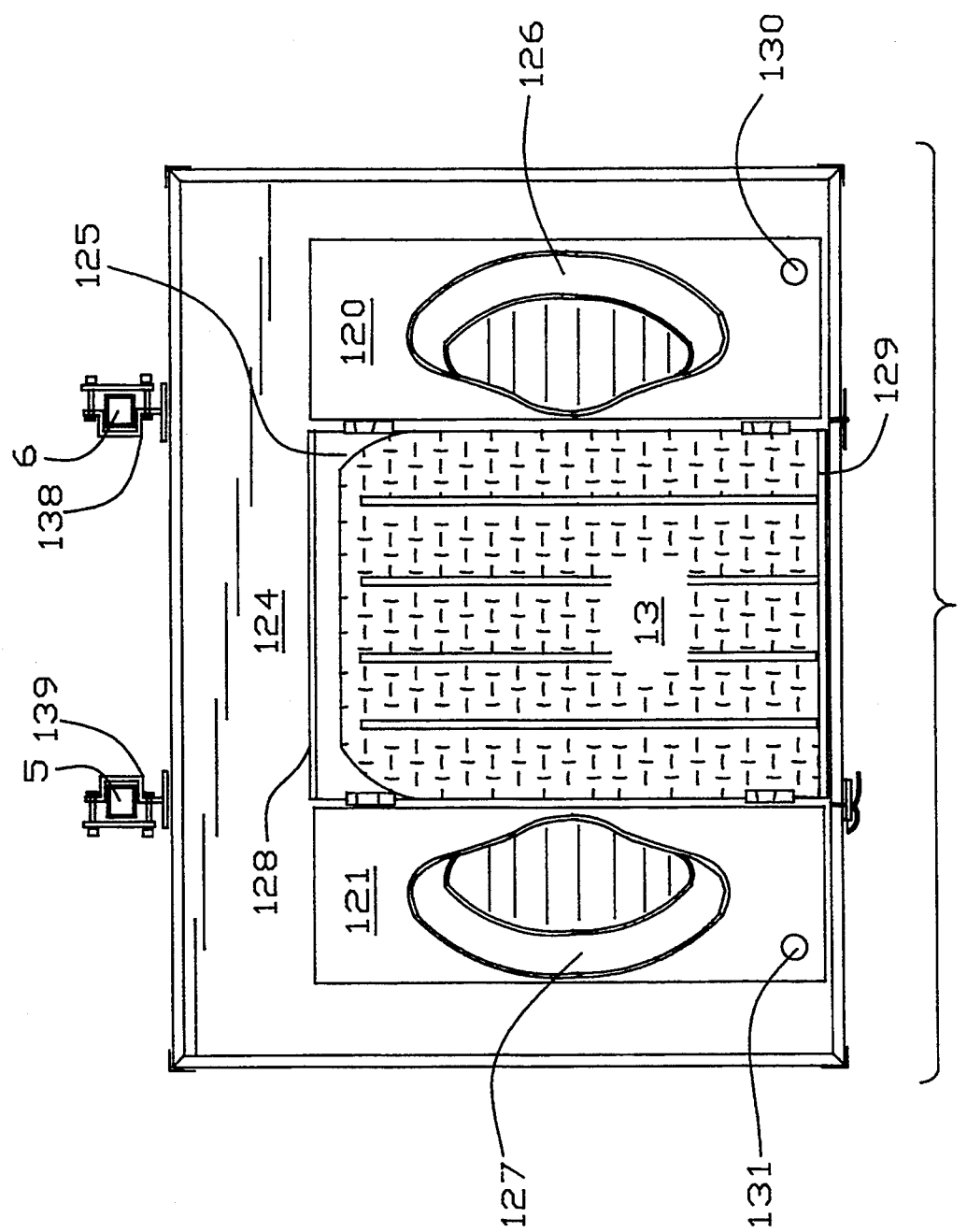
FIG. 4 is a plan view of the passenger/cargo carrier unit showing the base opening sections in the fully open position, showing the passenger seats, and showing the bottom of the golf bag well.
Figure 5:
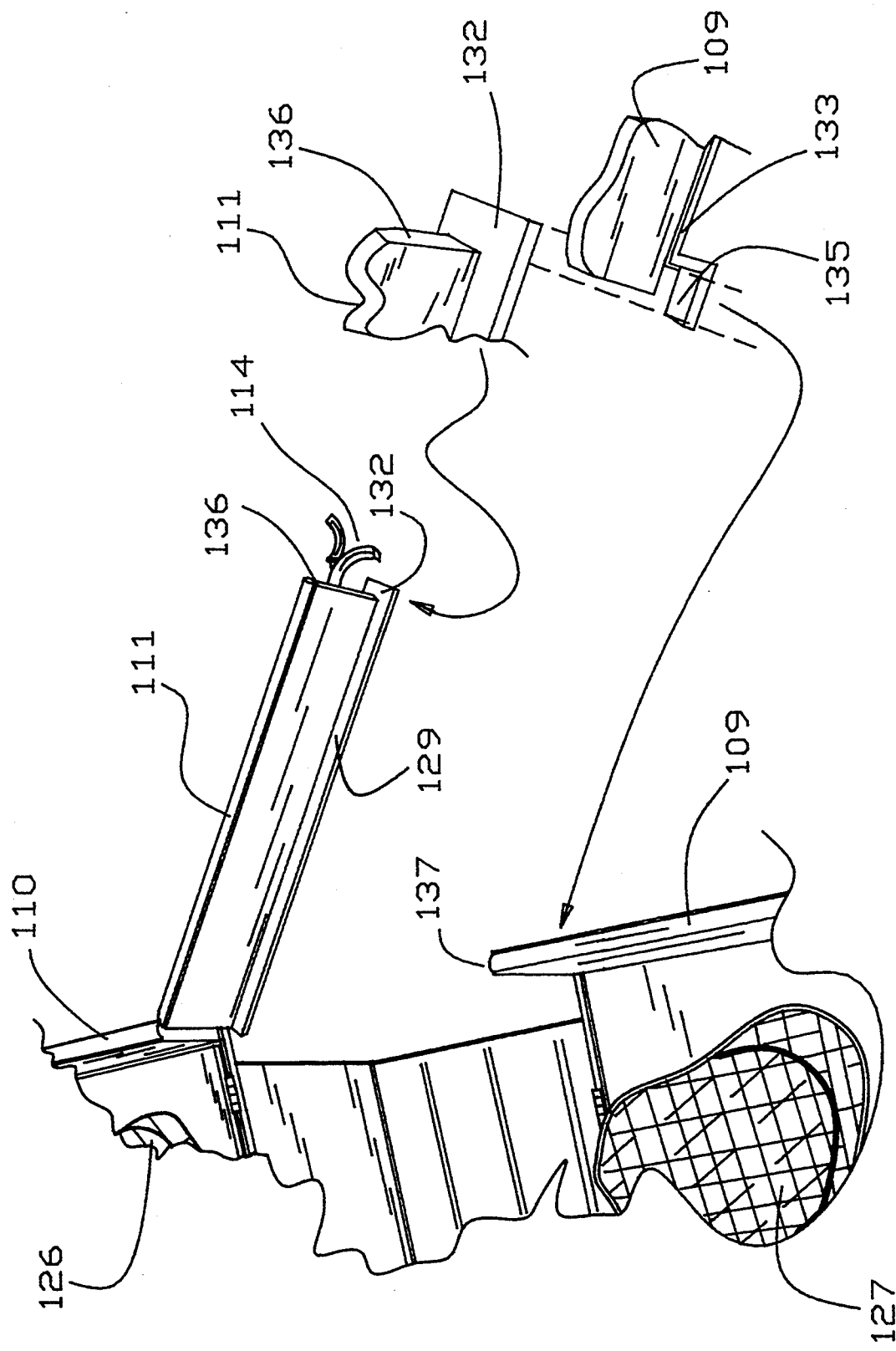
FIG. 5 shows the details of the swinging rear gate.
Figure 6:
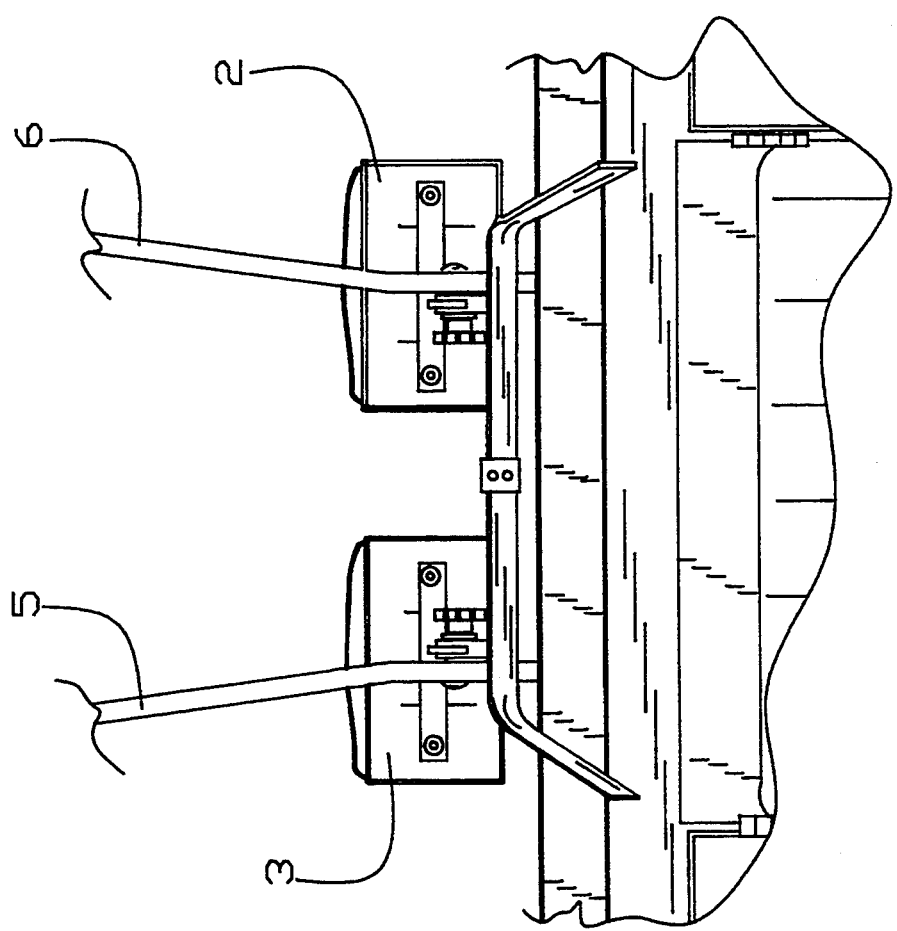
FIG. 6 is an isometric view of the golf bag holder and swing-away brackets in the normal position.
Figure 7:
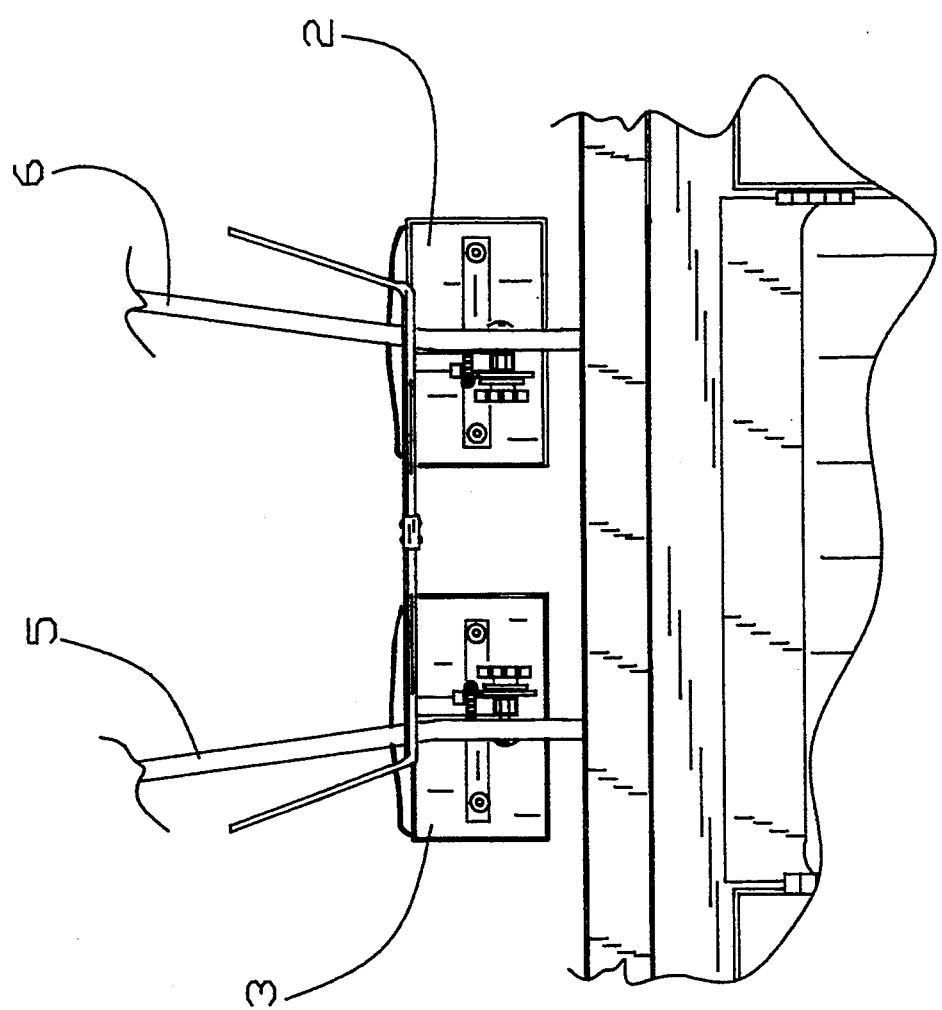
FIG. 7 is an isometric view of the golf bag holder and swing-away brackets in the out-of-the-way position.
Figure 9:
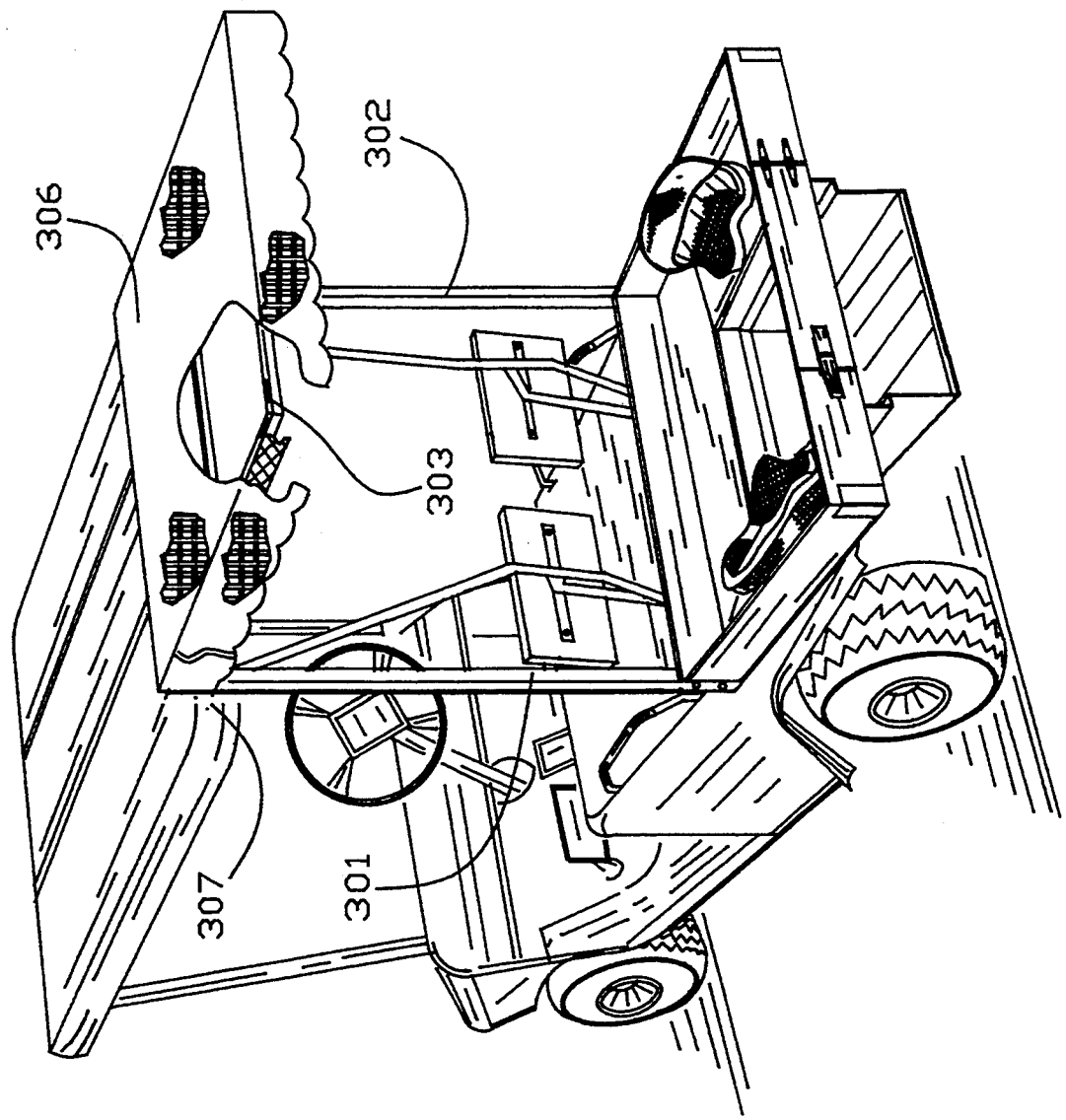
FIG. 9 is an isometric view of the rear canopy showing the support arms and with the canopy in its normal position.
Figure 10:
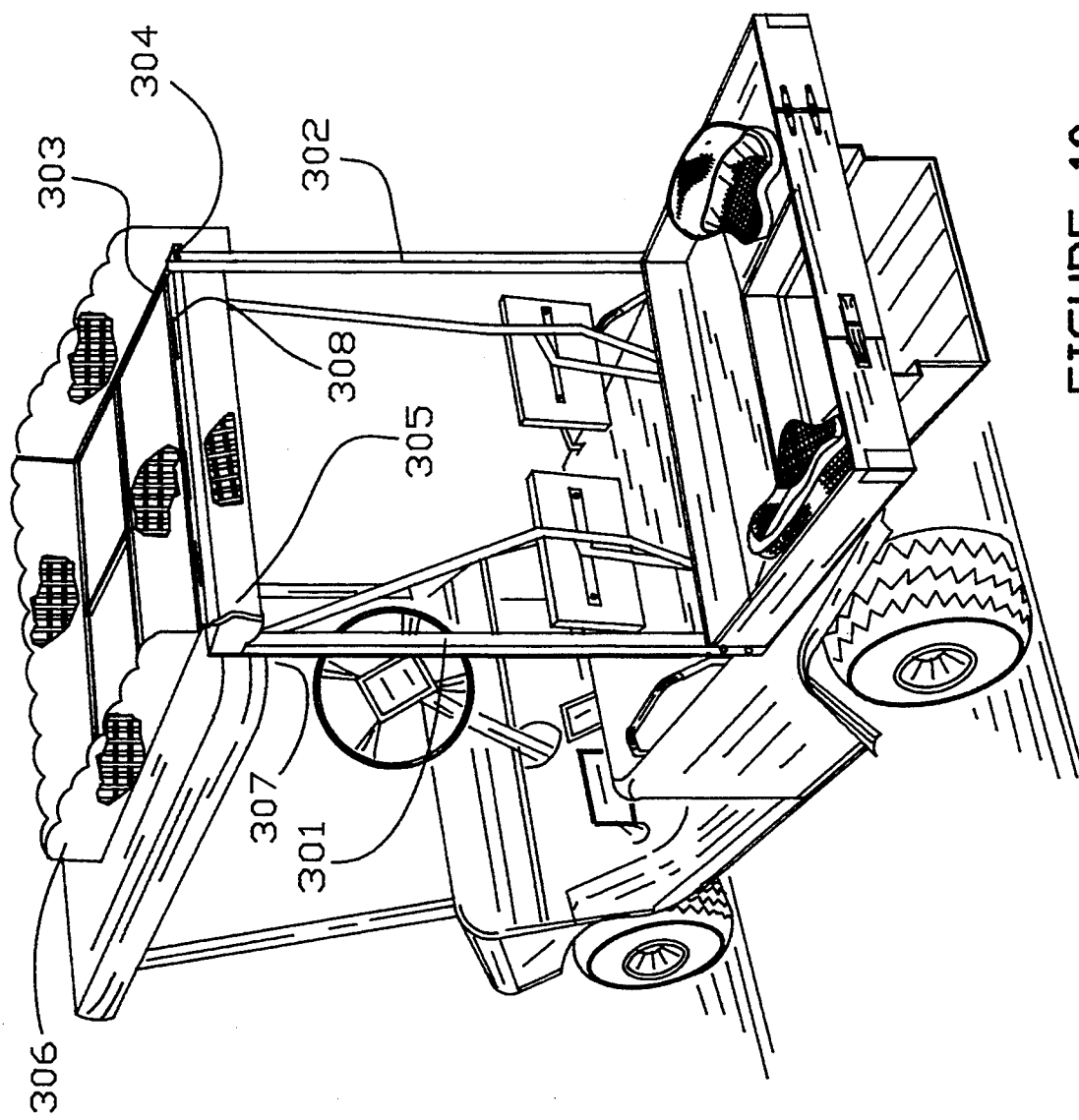
FIG. 10 shows the rear canopy in its out-of-the-way position.

The passenger/cargo unit, shown generally as item 100 in FIG. 1 through FIG. 5 is the basic building block of the system. The swing-away brackets, shown generally as item 200 in FIGS. 6 through 8, are needed when the user intends to switch between the pure golf cart and the extra passenger/cargo configuration. If the user never intends to use the cart as a golf cart to carry clubs, then the swing-away brackets are not needed. In a similar manner, the rear canopy, shown generally as item 300 in FIGS. 9 through 10, is an optional extra, in that the user may decide not to purchase nor use the canopy. The rear canopy is designed to be mounted to the passenger/carrier unit and used in conjunction with that passenger/cargo carrier unit. In addition, this innovative rear canopy allows previous after market inclement weather covers to still be used on the cart. It may be possible to design a separate rear canopy support system that attaches to an existing golf cart so that the rear add-on canopy does not interfere with after market options; such a design is beyond the scope and claims of this patent, but the concept should be noted as being disclosed in this patent.

Figure 3:
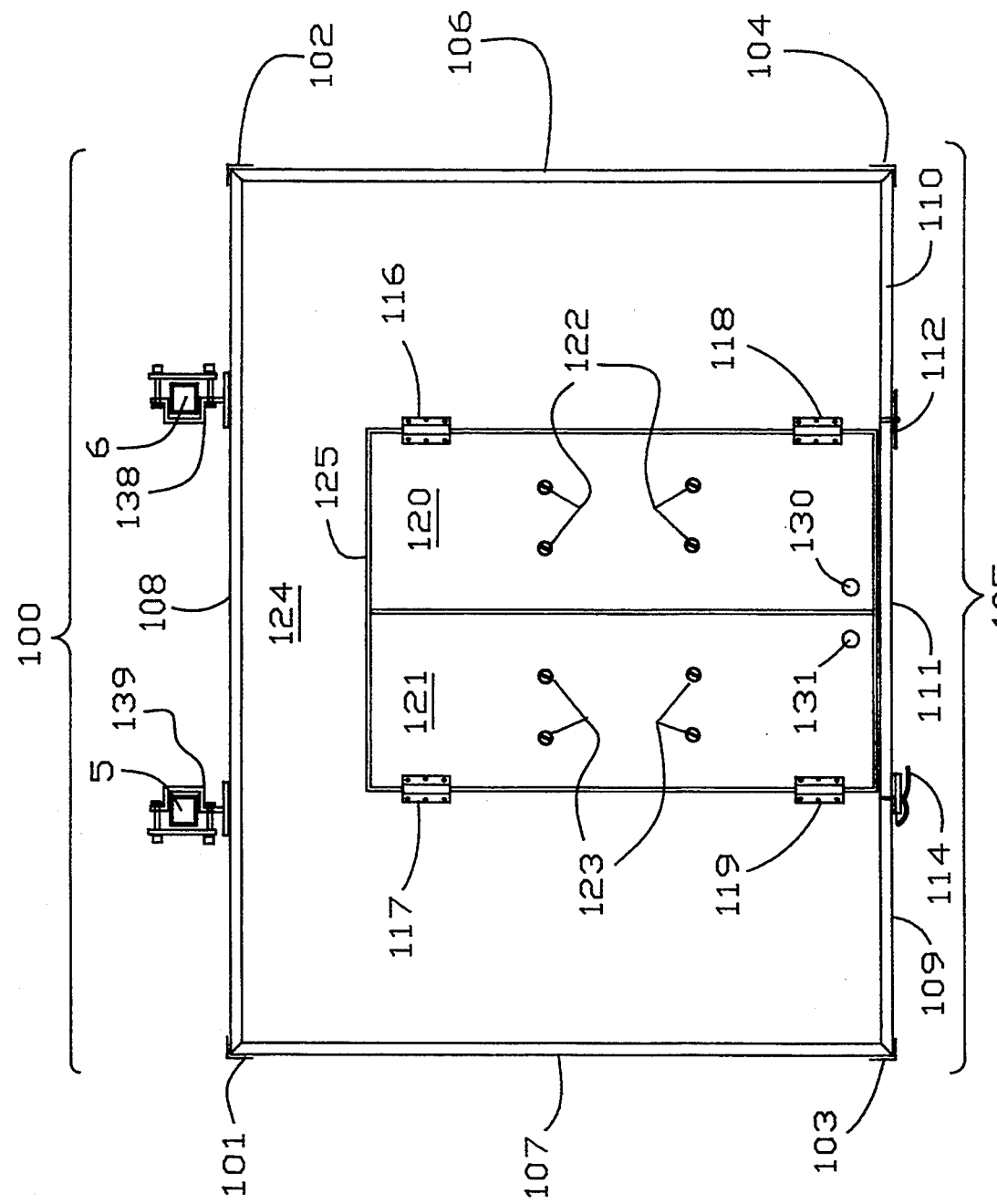
FIG. 3 is a plan view of the passenger/cargo carrier unit showing the base opening sections in the closed position.

The passenger/cargo carrier unit consists of five major parts and a series of sub-assemblies. Referring to FIG. 3, the major parts of the unit are:

the front frame side wall, 108, the right, 106, and left, 107, frame side walls, the rear frame side wall assembly, generally item 105, and the unit base (or bottom), 124.

The frame side walls and base are preferably constructed of decorative wood which is stained a maple/redwood color; although it would be possible to use plastics and molding techniques to manufacture the carrier unit as a whole piece. The use of other materials of construction is not beyond the scope of this disclosure and the preferred use of wood should not be construed as a limitation on the disclosure. The preferred use of wood and the particular stain color is chosen so that the carrier unit will aesthetically match the various color schemes provided by the golf cart manufacturers. Furthermore, is easier to match the rear seat color to the stained wood frame and base.

The frame sides, with the exception of the swinging gate, 111, are properly affixed to the unit base (or bottom), 124 using fasteners and waterproof glue. The frame sides are further reinforced by frame brackets, 101-104, screwed to the frame sides at all four corners of the frame. The swinging gate, 111, is fastened to a rear frame side section (the illustration shows attachment to the right hand side section, 110) by two sets of hinges, 112 and 113. It would be possible to reverse the action of the door by reversing the hinges and latch. The height of the swinging gate is equal to that of the frame sides plus the thickness of the base. This choice is made so that the opening rear lip, 129, which is to be attached to the gate is at the proper position to be able to support the hinged seat panels, 120 and 121.

The swinging gate is kept closed by a draw latch, 114, mounted to the gate and interacting with a catch, 115, mounted on the opposite rear frame section (the illustration shows attachment to the left hand side section, 109) both of which act together to draw the gate closed. To make a secure closure, the gate jambs, 136 and 137, are slightly angled from perpendicular. This assures that the gate will not pull into the opening, 125, in the carrier unit base. There is a metal lip, 129, firmly attached to the underside of the gate which extends into the opening. The lip also extends past the draw latch end of the gate to form a gate metal tongue, 132. These details are shown in FIG. 5. The gate metal tongue, 132, slides into and meshes with the tongue grove, 135, which is formed in a metal assembly, 133. The metal grove assembly, 133, is firmly attached to the underside of the base under the frame rear section next to the catch, 115. The tongue and groove assembly add extra strength to the swinging gate when it is in the closed position. This means that a person may sit on the closed gate, cargo may lie on the closed gate, or weight can be transferred from the hinged seat panels, 120 and 121, to the rear opening lip, 129, without pushing the gate downwards and breaking the hinges or the draw latch and catch.

The opening, 125, in the carrier unit base, sits directly over the golf club well, 13, of the golf cart. The opening is closed when the carrier is used in the cargo mode, as shown in FIG. 3. And the opening is open when the carrier is used in the passenger mode, as shown in FIG. 4. There are two covers or hinged seat panels, 120 and 121, which close the opening. These panels rotate about a their own pair of hinges, 116/118 and 117/119 and have finger holes, 130 and 131, to aid in opening the panels. There is a metal lip in the opening to carry the load of the panels when they are closed. The lip has two sections. The front lip, 128, is attached to the underside of the base; and the rear lip, 129, which has been described, is attached to the underside of the swinging gate, 111.

The hinged seat panels serve several purposes; first, to close the opening, second, to hold the rear passenger seats and allow rear passengers to be seated, and third to allow access to the golf club bag well for golf club bag storage. The rear passenger seats are attached to the underside of the panels; underside being defined when the panels are closed. The seats can be attached by any reasonable means, the preferred means being screws, 122 and 123, as shown in FIG. 3. The panels are shown in their open position in FIG. 4. When the panels, 120 and 121, are open, their associated seats, 126 and 127, are positioned over the respective right and left rear fenders and resting on the carrier base, 124. The open opening exposes the golf club well, 13. The two seats, 126 and 127, face each other across the well. The rear passengers open the swinging gate, step into the well and sit "sidesaddle" facing each other. The swinging gate is then closed and the cart may now safely carry the extra passengers. The rear passengers may easily hold onto the front canopy rear support tubes for extra safety. The carrier is quickly converted back to a cargo unit by closing the panes. It is possible to close one panel and use half of the passenger/cargo carrier to carry both a single passenger and cargo. Note, that to carry golf clubs, the panels would be opened and the bag inserted into the exposed well; thus, the cart readily returns to its original use.

Figure 1:
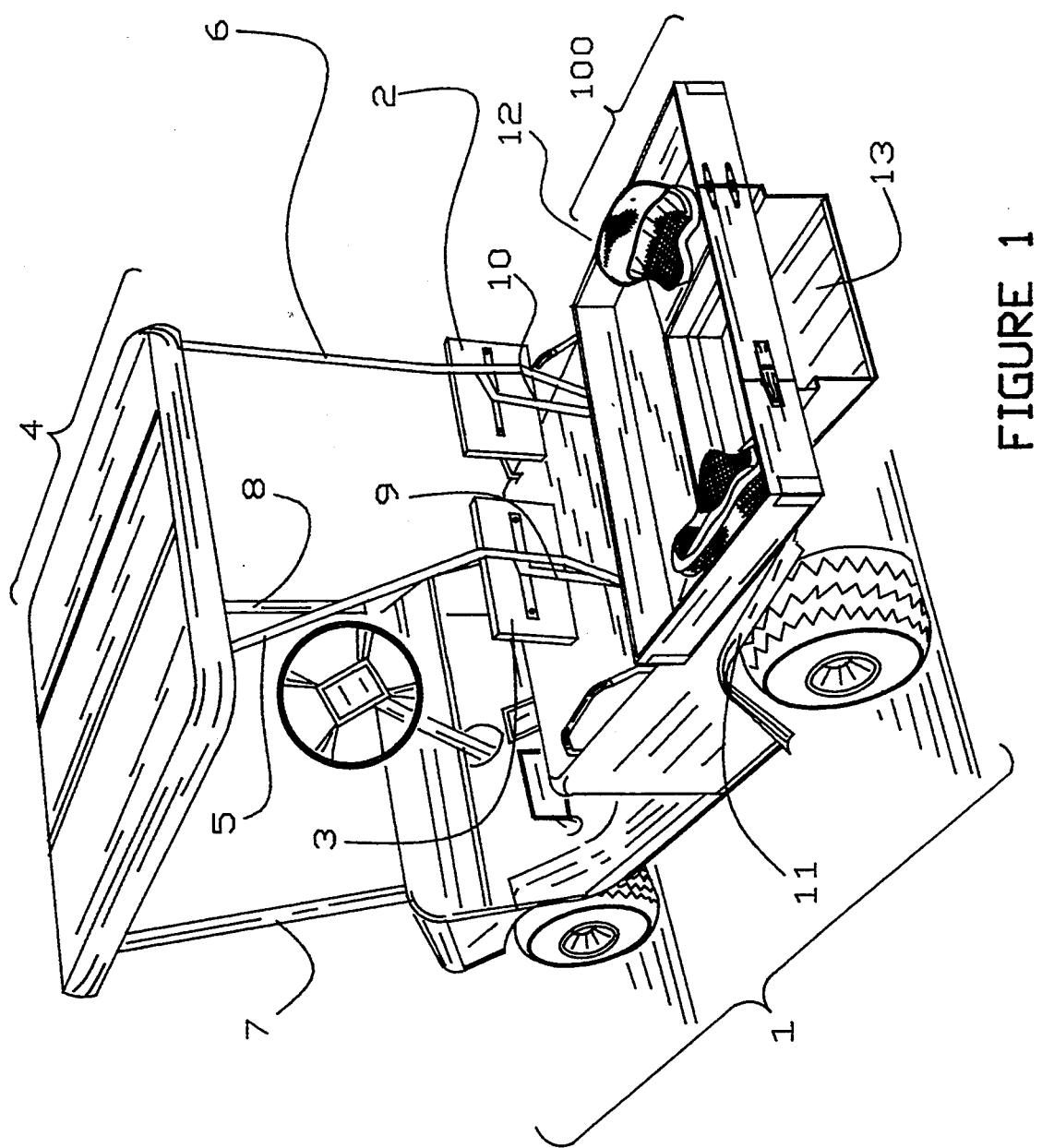
FIG. 1 is an isometric view of the passenger/cargo carrier unit in place on the rear of a golf cart or utility vehicle and set for passenger operation.
Figure 2:
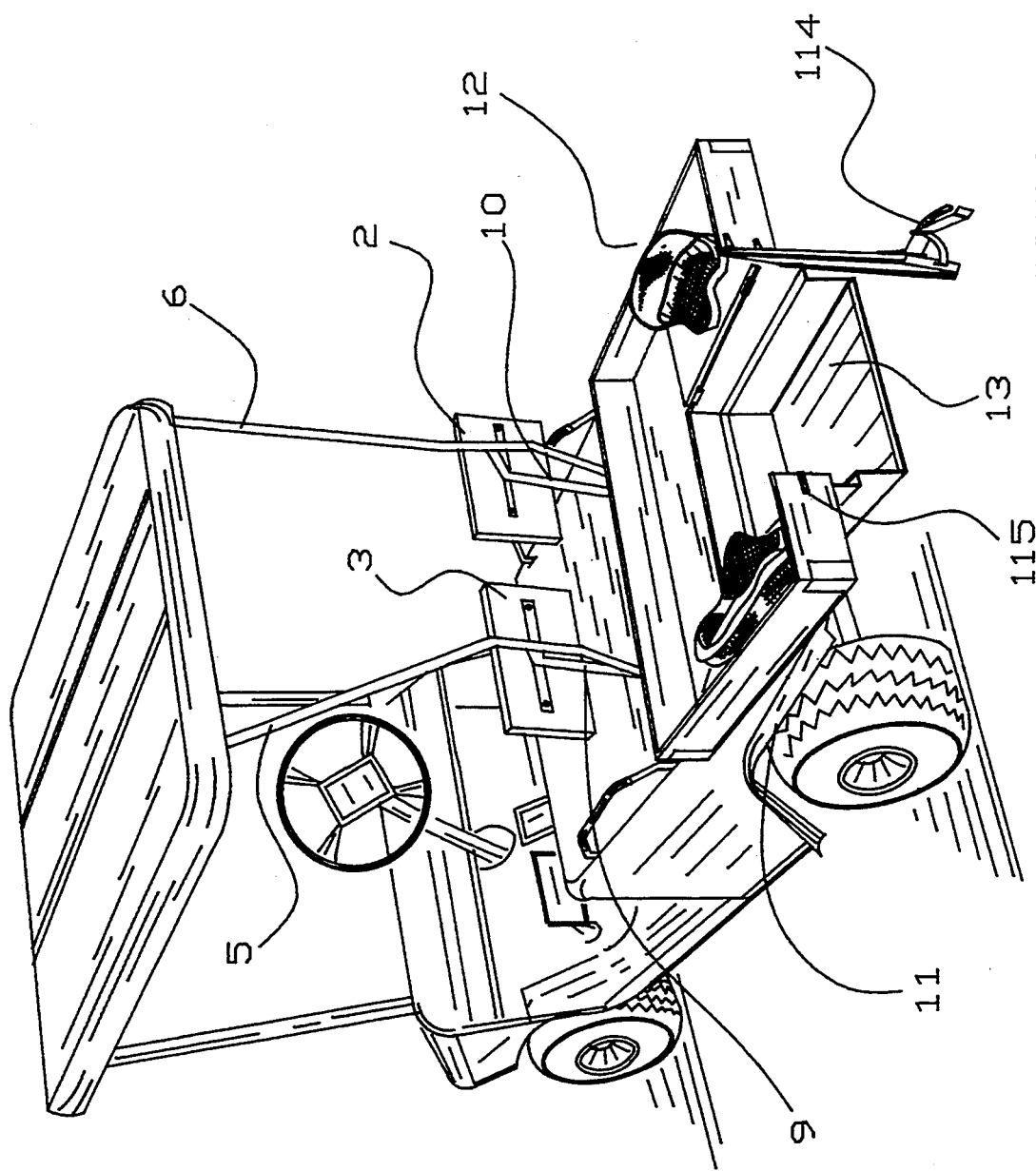
FIG. 2 is the isometric view of FIG. 1 showing the rear gate open.

The passenger/carrier unit is set on top of the rear wheel fenders of the golf cart as shown in FIG. 1. No holes need be drilled in golf cart to attach the unit to cart as the weight of the unit itself will hold it down on the fenders. The weight of the unit, plus the weight of any passengers or cargo within the unit, is transferred to the fenders. The unit is held in place by two attachment clamps, 134, which affix between the front side frame and the rear front canopy support tubes. Each attachment clamp is essentially a piece of bar stock which is clamped to the rear front canopy support tubes, 5 and 6, next the point where tubes attach to the cart fender, using a u-bolt and nuts. The other end of the attachment clamp is bolted to the right, 138, or left, 139, attachment bracket respectively as illustrated in FIG. 3. The attachment brackets are themselves firmly affixed to the front frame of the carrier unit. This method secures the passenger/carrier without damage to the cart and means that the unit can easily be removed for whatever reason. The installation can be performed by the average consumer/user within 10 or so minutes.

The original golf club bag holder, 14, that comes with the cart can cause some problems. FIG. 6 is an isometric view of the golf cart showing the holder in its normal position. The holder consists of a u-shaped bracket which is positioned immediately over the golf club bag well. It is readily apparent that the u-shaped bracket will preclude any passenger from sitting on the rear seats and thus the holder must either be permanently removed or pushed out of the way. The u-shaped bracket is welded to the same two support bars, 9 and 10 that hold the front seat backs (2 and 3) in place. In turn these two support bars are bolted to the manufacturer's canopy support arms, 5 and 6, to provide extra stability for both the canopy and the seat backs. It is possible to saw the holder/seat support bars in two next to the point at which these bars are bolted to the canopy support bars. If this is done, then the u-shaped holder will never be in the way of rear passengers nor cargo. This "fix" will not affect the front seat backs. The approximate cut point is 15 and 16 as shown in FIG. 8A. The removal of the holder will cause no problem if the user (or remover) never ever intends to use the cart as a golf cart or if the user does not mind the golf bags lying loose in the bag well, 13. The passenger/carrier system resolves this problem by providing a pair of swing-away brackets.

The swing-away brackets, 201, are shown in FIGS. 6, 7, and 8A through 8E. FIG. 8A is a plan view of the golf club bag holder, 14, attached to the two seat back support tubes, 9 and 10. These two support tubes are cut in two at points 15 and 16 as shown. Forming two pairs of support tubes 9 and 9H and 10 and 10H. As stated above, if the user never desires to carry club clubs the holder, 14, and the extra support tubes, 9H and 10H, should be discarded. The swing-away brackets allow the golf club bag holder to be retained on the cart and allow that holder to "swing-away" and not interfere with rear passengers or cargo.

Two swing-away brackets are required, one behind the driver's seat, 3, and one behind the front passenger seat, 2. The swing-away bracket, 201, shown in detail in FIGS. 8B through 8E, consists of a short length of aluminum u-channel about 6 inches long. At one end a bolt hole, 209, is drilled to match the manufacturer's bolt size used on the cart to bolt the canopy support to the front seat back support; this bolt is usually a ⅜ inch bolt. At the other end of the bracket, and slightly over mid way, a portion of lip of the u-channel is machined (or ground) away from the bracket to form a flat for a screw clamp, 207. The end opposite the bolt hole retains about ½ to ¾ inches of u-channel lip which forms the holder bar slot, 206. The lips at the bolt hole end form the seat support bar slot, 208. Both of the original manufacturer's bolts which join the seat back support tube to the canopy support tube, 5 and 9 on the driver's side and 6 and 10 on the front passenger's side are replaced with a longer bolt, 203. The length of this bolt is about ½ inch longer than the original to allow for the extra thickness of the swing-away bracket.

A swing-away bracket, 201, is clamped to one of the seat support tubes, 9H and 10H, which remain welded to the golf club bag holder by a simple stainless steel screw clamp, 205. This operation is repeated for the other support tube on the holder. The holder, 14, plus the swing-away brackets are then mated to their respective seat support arms by placing the bolt hole, 209, of the swing-away bracket over the extended bolt which now joins the seat back support tube to the canopy support tube. The remaining slot, 208, on the swing-away bracket catches about the remaining fixed portion of the seat back support tubes 9 and 10. A washer, 204, is placed over the bolt and molded knurled knob, 202, is screwed onto the bolt, 203. This operation is repeated on both sides. When the swing-away bracket is installed in the manner explained, the action of the brackets and the knurled knobs firmly hold the golf club bag support bracket, 14, in its original position.

The golf club bag support bracket easily swings out of the way as shown in FIG. 7 to allow passengers of cargo to use the carrier unit without interference with the holder. The knurled knobs are loosened and the two support tubes, 9H and 10H, which are joined to the holder, 14, are pulled towards each other. This action pulls the fixed seat back support tubes, 9 and 10, out of their matching slots, 208, on the swing-away bracket. At this point, the user simply pulls upwards on the holder tubes, 9H and 10H, and rotates the holder about bolt 209 until the holder rests against the front canopy support tubes, 5 and 6. The user then tightens the knurled knobs to prevent the holder from dropping back into its original position. To restore the holder to "golf bag position" the user loosens the knurled knobs and flips the holder downward. The swing-away brackets will immediately catch the seat back support tubes and the user then tightens the knobs.

The final part of the passenger/carrier system is the rear canopy as shown in FIGS. 9 and 10. The canopy is designed, like all canopies, to keep sun and rain from the passengers or cargo that may be carried in the passenger/cargo unit. This canopy differs from other rear passenger canopies in that it is not attached to the existing front canopy. The rear canopy is designed as a "stand-alone" addition in that its support comes from two canopy support columns, 301 and 302, which are attached to the carrier side frames. In fact, the canopy support columns are to take the place of the two front frame brackets, 101 and 102, respectively. If the user decides to employ the rear canopy, the user simply unscrews the left, 101, and right, 102, hand front frame bracket on the passenger/carrier unit and screws the left, 301, and right, 302, canopy support column in their place. The canopy support column is manufactured from angle-aluminum (although other materials could be used) and serves to amply support the rear canopy. The two support columns are joined by a cross brace, 308, to which the rear canopy frame, 307, is attached by hinges, 304 and 305.

Adjustment of the canopy when it is positioned immediately over the passenger/cargo carrier unit is accomplished by an "in-place" adjustment means. It is physically impossible to design a retrofitable rear canopy that would fit exactly parallel over the passenger/cargo carrier unit; hence, an "in-place" adjustment means has been designed by the inventor. Essentially the adjustment means comprises a simple assembly made up of a pair of nuts and bolts (quarter inch in diameter or larger). The nuts are attached to the canopy cross brace next at each end next to the hinges, 309 and 310, or at each end of a piano hinge if such hinge is used. A hole is drilled through the cross brace so that the bolt can pass through the nut and the cross brace. It would be possible to thread the cross brace an do away with the nut, but this is not a preferred method. The bolts are threaded through their respective nuts so that the bolt head faces backward over the passenger/cargo carrier. When the canopy is placed in its "in-place" position, over the carrier unit, the frame of the canopy rests against the bolt heads. The bolts are screwed in or out in order to raise or lower each side of the canopy frame. Minor experimentation by the user will easily yield the proper position of the bolts. The bolts can be held permanently in place by a second nut, if desired, which acts as a lock nut.

The rear canopy cover, 306, is manufactured from canvass or plastic and is held in place by rolling the edge of the cover about the frame and securing the cover to itself by Velcro ® strips. The choice of rolling the cover about the frame and using Velcro ® strips was made so that the user could easily replace the cover. It is known that all items of manufacture will vary, and one canopy frame could be slightly larger or smaller than another. The use of Velcro ® and rolling of the cover about the frame in order to secure the cover to frame will allow for the maximum variance in manufacture and for maximum security of attachment. In fact, the rear canopy is well enough secured that a cart utilizing this rear canopy can be towed, on a trailer, at highway speeds with no damage to the canopy.

The canopy rotates about hinges, 304 and 305, to fold down flat on top of the manufacturer's front canopy. This action is very important when removing golf clubs from vertically held golf bags in the rear of the cart. A golf bag is about 4 feet long and a club is about the same length. To remove a club from a bag, the club must be pulled upward far enough to clear the bag. This means that the head of a club will be about 8 feet above the bottom of the bag or the bottom of the well, 13. If the rear canopy did not swing out of the way, a golf club could not be readily withdrawn from its bag, because the head would not clear the rear canopy.

Finally, it should be noted that the rear canopy does not attach to the front canopy nor to the rear front canopy support tubes, 5 and 6. There are numerous roll down covers supplied for golf carts which attach to the front canopy and roll down on all four sides to protect the front passengers in the event of inclement weather. These covers cannot be used if the rear canopy attaches to the front canopy or the front canopy rear support tubes. The gap, 307, between the rear canopy and the front canopy extends from the top of the front canopy all the way down the rear wheel fenders. The creation of this gap is the reason that separate rear canopy support columns, 310 and 302, are used. Thus any after market roll down protector can be used on a cart using this form of rear canopy. This feature is very useful to a present owner who has these inclement weather protectors and wishes to utilize the present invention. That user may do so without having to purchase new roll down covers.

I claim:

1. A Retrofitable Carrier Apparatus for a Golf Cart having a golf club bag well attachable to seat back support columns or canopy support columns of and mountable upon horizontal planar surfaces found at the rear of a motor driven golf cart substantially parallel to the golf cart travel surface to expand the golf cart holding capacity for passengers and/or cargo without drilling mounting holes in the golf cart, said carrier apparatus comprising:
   (a) a mounting base, adapted to be located substantially over the golf club bag well, having an upper surface and a lower surface and having a front edge, a back edge, a left edge, and a right edge, with said lower surface placed on the horizontal planar surfaces of the golf cart so that said mounting base is substantially parallel to the cart travel surface;
   (b) frame side walls affixed to the upper surface of said mounting base at said edges thereof and extending about said front, right, left, and back edges of said mounting base forming respectively a front edge frame side wall, a right edge frame side wall, a left edge frame side wall, and a back edge frame side wall; and
   (c) demountable attachment means for releasably connecting said carrier apparatus to the golf cart support columns wherein said carrier apparatus can be placed and retained oil the cart without making permanent structural modifications to the cart.

2. The Retrofitable Carrier Apparatus of claim 1 in which said demountable attachment means comprises a clamp means capable of demountable attachment to the golf cart support columns.

3. The Retrofitable Carrier Apparatus of claim 2 in which said clamp means is a pair of adjustable clamps.

4. The Retrofitable Carrier Apparatus of claim 2 in which said demountable attachment means comprises a plurality of flexible members passing between the support columns and the carrier unit.

5. A Retrofitable Carrier Apparatus for a Golf Cart having a golf club bag well attachable to seat back support columns or canopy support columns of and mountable upon horizontal planar surfaces found at the rear of a motor driven golf cart substantially parallel to the golf cart travel surface expand the golf cart holding capacity for passengers and/or cargo without drilling mounting holes in the golf cart, said carrier apparatus comprising:
   (a) a mounting base, having an upper surface and a lower surface and having a front edge, a back edge, a left edge, and a right edge, with said lower surface placed on the horizontal planar surfaces of the golf cart so that said mounting base is substantially parallel to the cart travel surface;
   (b) frame side walls affixed to the upper surface of said mounting base at said edges thereof and extending about said front, right, left, and back edges of said mounting base forming respectively a front edge frame side wall, a right edge frame side wall, a left edge frame side wall, and a back edge frame side wall;
   (c) demountable attachment means for releasably connecting said carrier apparatus to the golf cart support columns wherein said carrier apparatus can be placed and retained on the cart without making permanent structural modifications to the cart; and,
   (d) a generally rectangular aperture having front, left and right sides which are parallel to said respective front, left and right edges of said mounting base and with said aperture adapted to be located substantial over the golf club bag well, said aperture further having a backside being co-located along said back edge of said mounting base.

6. The Retrofitable Carrier Apparatus of claim 5 wherein said back edge frame side wall comprises:

(a) a first and a second rear frame side section affixed to said upper surface and back edge of said mounting base and between said respective right side of said aperture and right edge of said mounting base and between said, respective left side of said aperture and left edge of said mounting base;

(b) a metal groove assembly attached to the underside of said mounting base immediately below said first rear frame side section, said groove assembly having a tongue groove;

(c) a door, having a first end and a second end anti having an upper edge and a lower edge and having an inside and outside, pivotally interconnected to said second rear frame side section such that said door can be placed in an open position or a closed position;

(d) a hinge means between the second end of said door and said second rear frame side section:

(e) an angled door jamb formed at said first end of said door;

(f) a matching rear side section jamb formed at said first frame side section, wherein said matching rear side section jamb meshes with said angled door jamb;

(g) a draw latch between the first end of said door and said first rear frame side section, said draw catch capable of drawing and meshing said angled door jamb into said matching rear side section jamb when said door is in said closed position; and, (h) an opening rear lip attached to the lower edge of said door, said opening rear lip projecting past said inside of said door and extending from said second end of said door and projecting past said first end of said door to form a gate metal tongue capable of carrying a load at said first end of said gate, said gate metal tongue slidingly received within said tongue groove whenever said door is in said closed position.

7. The Retrofitable Carrier Apparatus of claim 6 further comprising a removable cover to be removably placed over said aperture.

8. The Retrofitable Carrier Apparatus of claim 7 wherein said removable cover includes a left hand cover and a right hand cover respectively hinged to said mounting base at said left and right hand sides of said aperture such that said covers can be placed in an open position and a closed position and further having a top side and a lower side defined such that said top side forms an extension of said upper surface of said mounting base whenever said left or right covers are in said closed position and said lower side of said cover is exposed whenever said cover is in said open position.

9. The Retrofitable Carrier Apparatus of claim 8 further comprising a passenger seat affixed to each of said lower side of said covers such that said seat is exposed and useable whenever said covers are in said open position.

10. The Retrofitable Carrier Apparatus of claim 8 further comprising an opening front lip affixed to said lower surface of said mounting base at said front side of said aperture such that said opening front lip extends slightly into said aperture and together with said rear opening lip form a pair of resting lips for said right and left covers whenever said right and left covers are in said closed position.

11. The Retrofitable Carrier Apparatus of claim 10 further comprising a right frame front bracket demountably affixed between said front frame side wall and said right frame sidewall and a left frame front bracket demountably affixed between said front frame side wall and said left frame side wall.

12. The Retrofitable Carrier Apparatus of claim 1 further comprising a set of right and left rear frame side brackets affixed between said back edge frame side wall and said respective right and left edge frame side walls.

* * * * *